(12) United States Patent
Lindqvist et al.

(10) Patent No.: US 8,848,555 B2
(45) Date of Patent: Sep. 30, 2014

(54) METHOD AND A SYSTEM FOR MANAGEMENT OF TRANSMISSION RESOURCES IN DIGITAL COMMUNICATION SYSTEMS

(75) Inventors: Fredrik Lindqvist, Järfälla (SE); Boris Dortschy, Hägersten (SE); Aldebaro Klautau, Belém (BR); Maria Neiva da silva fonseca Lindqvist, Älvsjö (SE); Evaldo Goncalves Pelaes, Belém (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 160 days.

(21) Appl. No.: 13/130,127

(22) PCT Filed: Nov. 27, 2008

(86) PCT No.: PCT/EP2008/010080
§ 371 (c)(1),
(2), (4) Date: May 19, 2011

(87) PCT Pub. No.: WO2010/060446
PCT Pub. Date: Jun. 3, 2010

(65) Prior Publication Data
US 2011/0222611 A1    Sep. 15, 2011

(51) Int. Cl.
| | |
|---|---|
| H04L 25/08 | (2006.01) |
| H04M 3/18 | (2006.01) |
| H04B 3/32 | (2006.01) |
| H04L 5/00 | (2006.01) |
| H04L 25/02 | (2006.01) |
| H04L 27/26 | (2006.01) |

(52) U.S. Cl.
CPC . *H04B 3/32* (2013.01); *H04L 5/003* (2013.01); *H04L 25/0204* (2013.01); *H04L 27/2601* (2013.01)
USPC .......................................... 370/252; 375/148

(58) Field of Classification Search
None
See application file for complete search history.

(56) References Cited

U.S. PATENT DOCUMENTS

| | | | |
|---|---|---|---|
| 6,970,560 | B1 | 11/2005 | Hench et al. |
| 2005/0259725 | A1 | 11/2005 | Cioffi |

(Continued)

FOREIGN PATENT DOCUMENTS

| | | |
|---|---|---|
| WO | WO 02/100008 A1 | 12/2002 |
| WO | WO 2006/103557 A1 | 10/2006 |

(Continued)

OTHER PUBLICATIONS

Verlinden, J. et al. Dynamic Spectrum Management for Digital Subscriber Lines—Edition 2. Technology White Paper—Alcatel. Jun. 2005.

(Continued)

*Primary Examiner* — Hassan Phillips
*Assistant Examiner* — Duc Duong

(57) ABSTRACT

The present invention relates to a method for managing transmission resources in a digital communication system comprising an access network, such as a DSL system, implementing resource management for minimization of cross-talk interference in a cable or cable binder of the access network comprising a number, N of lines. It comprises the steps of: determining, by means of calculating means, for a respective of said lines, a relevant line set, comprising interference relevant lines, for said respective line, and applying, for the respective line, an algorithm for resource management using the determined relevant line set, thus reducing computational complexity of the resource management algorithm.

21 Claims, 9 Drawing Sheets

(56) References Cited

U.S. PATENT DOCUMENTS

| | | | |
|---|---|---|---|
| 2007/0121715 A1* | 5/2007 | Shi | 375/224 |
| 2007/0274404 A1* | 11/2007 | Papandriopoulos et al. | 375/260 |
| 2009/0034554 A1* | 2/2009 | Evans et al. | 370/468 |
| 2009/0268601 A1* | 10/2009 | Fang et al. | 370/201 |
| 2009/0296865 A1* | 12/2009 | Ashikhmin et al. | 375/358 |
| 2010/0027601 A1* | 2/2010 | Fang | 375/222 |
| 2011/0026575 A1* | 2/2011 | Shalom et al. | 375/227 |
| 2012/0063531 A1* | 3/2012 | Ginis et al. | 375/285 |

FOREIGN PATENT DOCUMENTS

| | | |
|---|---|---|
| WO | WO 2006/120521 A1 | 11/2006 |
| WO | WO 2008/003107 A1 | 1/2008 |
| WO | WO 2008/030145 A1 | 3/2008 |

OTHER PUBLICATIONS

NIPP-NAI-2007-038 R3. Draft Dynamic Spectrum Management Technical Report for Second Default Ballot. May 14-17, 2007.

Tsiaflakis P. et al. Low-Complexity Dynamic Spectrum Management Algorithms for Digital Subscriber Lines. Proc. of the IEEE International Conference on Acoustics, Speech and Signal Processing (ICASSP 2008), Las Vegas, USA, Mar. 2008.

Huwaei. Line Grouping and Crosstalk Channel Modeling in DSM level 2. NIPP-NAI-2008-092. Apr. 29-30, 2008.

Yu, et al. Distributed Power Control for Digital Subscriber Lines. IEEE J. Select. Areas Commun., vol. 20, No. 5, pp. 1105-1115, Jun. 2002.

Cendrillon, R. et al. Optimal Multi-user Spectrum Balancing for Digital Subscriber Lines. IEEE Transactions on Communications. May 2006.

Cendrillon, R. et al. Iterative Spectrum Balancing for Digital Subscriber Lines. IEEE International Communications Conference (ICC), May 2005.

Papandriopoulos, J. et al. Low-Complexity Distributed Algorithms for Spectrum Balancing in Multi-User DSL Networks. IEEE International Conference on Communications, Jun. 2006.

Ginis, G. et al. Vectored Transmission for Digital Subscriber Line Systems. IEEE Journal on Selected Areas in Communications, vol. 20 No. 5, Jun. 2002.

Cioffi, J. et al. Vectored DSLs with DSM: The Road to Ubiquitous Gigabit DSLs. 2006.

Cendrillon, R. Multi-User Signal and Spectra Co-Ordination for Digital Subscriber Lines. Dec. 2004.

* cited by examiner

METHOD AND A SYSTEM FOR MANAGEMENT OF TRANSMISSION RESOURCES IN DIGITAL COMMUNICATION SYSTEMS

TECHNICAL FIELD

The present invention relates to a method for managing transmission resources in a digital communication system comprising an access network, e.g. a DSL-system, and which implements resource management to reduce impairments, such as cross-talk interference, particularly FEXT (far-end-cross-talk), NEXT (near-end-cross-talk), in cable binders or cables of the access network.

BACKGROUND

DSL (Digital Subscriber Line) systems have become important within digital communication. One reason therefore is that DSL systems are capable of offering a large bandwidth for digital communication over existing telephone subscriber lines. Introduction of new applications and the need for services and variety in service offerings increase the need for broadband transmissions. Transmission rates steadily increase. The signal-to-noise-ratio (SNR) on communication lines has a strong influence on the performance of a broadband network and if it is not satisfactory, it restricts the use of such networks. Cross-talk is an important source of noise in DSL systems, for example ADSL and VDSL. Cross-talk adversely affects a signal when it passes through a transmission path and it may result in a corrupted signal which can be misinterpreted on the receiving side and translated to contain errors in the digital bit stream.

NEXT is defined as noise induced between lines at the near end of a link, which is defined as the end closest to the point of origin of the signal. FEXT is defined as noise induced onto an adjacent line by a transmitter on the near end of a first line onto the receiver at the far end of a second line. FEXT may for example be the result of imperfections in the cable.

Thus, high-speed communication over DSL can be severely limited by interference from adjacent metal, mostly copper, lines, e.g. twisted-pair lines, in an access network. This destructive cross-talk between neighbouring lines is considered as one of the most dominant impairments and consequently affects performance and poses a limit for improvements in performance.

Dynamic spectrum management (DSM) is one resource management approach to improve the transmission capacity of DSL lines. In DSM an algorithm is applied on a (copper) access cable binder, which consists of a number N of users, or lines, equipped with DSL transceivers. Each transceiver employs discrete multitone modulation (DMT) and operates over a twisted-pair line with K independent sub-channels or tones, in this document in the following mainly referred to as frequencies. Also the expression "lines" will mainly be used instead of "users".

A received signal vector on tone (frequency) k can be modelled as:

$$\bar{y}^k = H^k \bar{x}^k + \bar{z}^k, \text{ for } k=1,2,\ldots,k$$

wherein:

$$\bar{x}^k = [x_1^k, x_2^k, \ldots, x_N^k]^T$$

is the transmitted signal vector on frequency k for all N lines, $$\bar{y}^k = [y_1^k, y_2^k, \ldots, y_N^k]^T$$

is the received signal vector on frequency k for all N lines, $$\bar{z}^k = [z_1^k, z_2^k, \ldots, z_N^k]^T$$

is the additive noise vector on frequency k including the extrinsic network impairment, e.g. impulse noise, radio frequency interference (RFI), thermal noise and alien cross-talk.

$H^k$ corresponds to an N×N matrix containing the channel transfer functions on frequency k, see FIG. 1B.

FIG. 1A illustrates DMT transmission for frequency k and produced FEXT and NEXT interference on a cable binder.

The channel matrix H in FIG. 1B characterizes the cable binder by representing both the direct transfer function and the FEXT/NEXT coupling transfer functions. It can be interpreted along the three dimensions N×N×K, i.e. the dimensions of the channel matrix.

Each channel vector $\bar{h}_{n,m} = [h_{n,m}^1, h_{n,m}^2, \ldots, h_{n,m}^K]$ represents the transfer function of the channel from a transmitter m to a receiver n over the frequency band (tones).

The DSM techniques implement power spectrum density (PSD) level optimization in order to assign a transmit PSD for each user within the DSL network to minimize cross-talk interference. The PSD assignment is conducted according to a set of predefined criteria and constraints, for example by maximizing user rates under power limitation, which can be one underlying basis or object of spectral management. Other objects or combinations of objects are possible.

The spectral management issue is commonly formulated as a maximization problem of a weighted-rate-sum, subject to a power constraint per user.

However, spectral management techniques in general, DSM techniques in particular, suffer from being complex (DSM level 2, as well as DSM level 3, Vectoring algorithms). DSM spectral management and vectoring is e.g. discussed in Dynamic Spectrum Management Technical Report (2007), ATIS Committee NIPP Pre-published document ATIS-PP-0600007. Several algorithms have been introduced for presenting a solution to the spectral management issue or problem referred to above. One of these algorithms is the Iterative Spectrum Balancing algorithm (ISB). ISB is for example described in "Iterative spectrum balancing for digital subscriber lines", by R. Cendrillon and M. Moonen, in IEEE Transactions on Communications, May 2006. The ISB algorithm adopts an optimization process involving a high computational complexity. In order to determine the best PSD distribution for N users, (i.e. N lines), on K frequencies, the ISB will result in a complexity of $O(P_{level}KN^2)$, i.e. Ordo $(P_{level}KN^2)$, wherein $P_{level}$ indicates total number of possible power levels.

However, a typical metal or copper access cable normally consists of several cable binders grouped together and resulting in a DSL network containing several twisted-pair lines, for example 100 lines. Even if the copper access cables are manufactured in order to minimize cross-talk, among others through trying to keep a twisting between lines along the cable, there are many lines and since the DSM technique uses all lines, i.e. the total number of lines, it is immediately apparent that a considerable amount of computations have to be performed. It is also a drawback that, if a state of a line must be updated, e.g. the transmission PSD level changed, then all the other lines in the binder must be updated as well. The DSM algorithm solutions typically have a quadratic complexity in the number of lines N and a linear complexity in the number of frequencies or tones K. The ISB algorithm has the complexity $O(P_{level}KN^2)$ as mentioned above.

Due to the computational complexity the deployment of DSM algorithms will be restricted, which is unfortunate. For example, a copper access network employing VDSL2 systems with K=4096 tones, a total of N=20 lines and $P_{level}$=112 levels, would result in a highly complex problem using current algorithms as discussed in the state of the art.

SUMMARY

It is therefore a first object of the present invention to provide an improved and less complex method for managing transmission resources in a DSL system. It is also an object of the invention to provide a resource management method for which computational complexity of used algorithms can be considerably reduced.

It is particularly a second object of the invention to enable reduction of complexity of used algorithms, e.g. DSM algorithms or other optimization algorithms, so that it becomes easier to provide a high performance, or increase performance, for high speed digital subscriber lines, and to make resource management easier and less costly to implement. Particularly it is an object to suggest a method through which resource management, e.g. through spectral management, to minimize or reduce cross-talk interference, FEXT and/or NEXT, can be handled in a more efficient, faster and cheaper manner.

It is a third object of the invention to provide a system through which one or more of the above mentioned objects can be achieved.

It has according to the present invention been realized that not all other lines of a cable or cable binder are relevant interferers for a particular line (or not all frequencies of other lines), and one or more of these objects can be achieved by finding a way to avoid unnecessary calculations since not all lines (or not all frequencies thereof) are relevant interferers.

Therefore a method as initially referred to is provided according to which, for a respective line (to be optimized), a line of a cable binder or a cable, a relevant line set is found which consists of lines which are considered as interference relevant lines for said respective line. The method then comprises the step of, for said line, implementing a resource management algorithm, which e.g. comprises a DSM or a vectoring algorithm, based on, or using, information of the previously determined relevant line set, hence reducing computational complexity of the used resource management algorithmn or algorithms.

This means that the resource management is not based on all lines as in the state of the art, but only on determined, here called interference relevant line sets, meaning the lines (or even more particularly only relevant frequencies on relevant lines) which actually are of importance for a respective line for interference purposes, i.e. which are dominating interferers to said line. Thus, according to the present invention it has been realized that not all lines, and not all frequencies, are relevant interferers and only the relevant interferers, lines and frequencies, need to be included in the computations. This means that a considerable amount of unnecessary computations can be avoided.

Thus, the inventive concept is based on finding the relevant interfering lines (frequencies), which has been realized to allow resource, particularly spectral, management with reduced complexity. Then a management algorithm is applied which is based only on these lines, i.e. only actually interfering frequencies of relevant lines need to be included in the calculations.

The objects are also achieved by a system for managing transmission resources in a digital communication system, such as a DSL system comprising an access network with a plurality of access cables comprising cable binders wherein each binder comprises a number of lines, e.g. twisted-pair-lines, but it may also be other lines. Each line is equipped with a near-end-transceiver and a far-end-transceiver and comprises means for applying a resource management algorithm, e.g. a DSM level 2 or level 3 (vectoring) algorithm. According to the invention the general object is achieved through determining means which are adapted to, for a respective line to be optimized, determine the relevant line set comprising interference relevant lines for said line. Means for applying a resource management algorithm on the lines to be optimized are adapted to apply, or base, said algorithm or algorithms, for each respective line to be optimized, on the respective determined interference relevant line set.

By interference relevant line set is particularly meant only the lines with at least one interfering frequency, and only these particular frequencies. Advantageous embodiments are provided by means of the respective dependent claims.

It is an advantage of the invention that the computational complexity of resource management algorithms, or DSM level 2 or 3 algorithms in general, can be considerably reduced. It is also an advantage of the invention that resource management in a DSL system can be improved and facilitated. It is a particular advantage of the invention that a solution is disclosed which does not depend on which specific algorithm that is used for resource management for optimization of transmission capacity of DSL lines. It is also an advantage of the invention that a method and a system respectively is provided which is comparatively insensitive to changes on a line, for example when a line changes states or transmission PSD levels.

BRIEF DESCRIPTION OF THE DRAWINGS

The invention will in the following be further described, in a non-limiting manner, and with reference to the accompanying drawings, in which.

DETAILED DESCRIPTION

Figure 2:
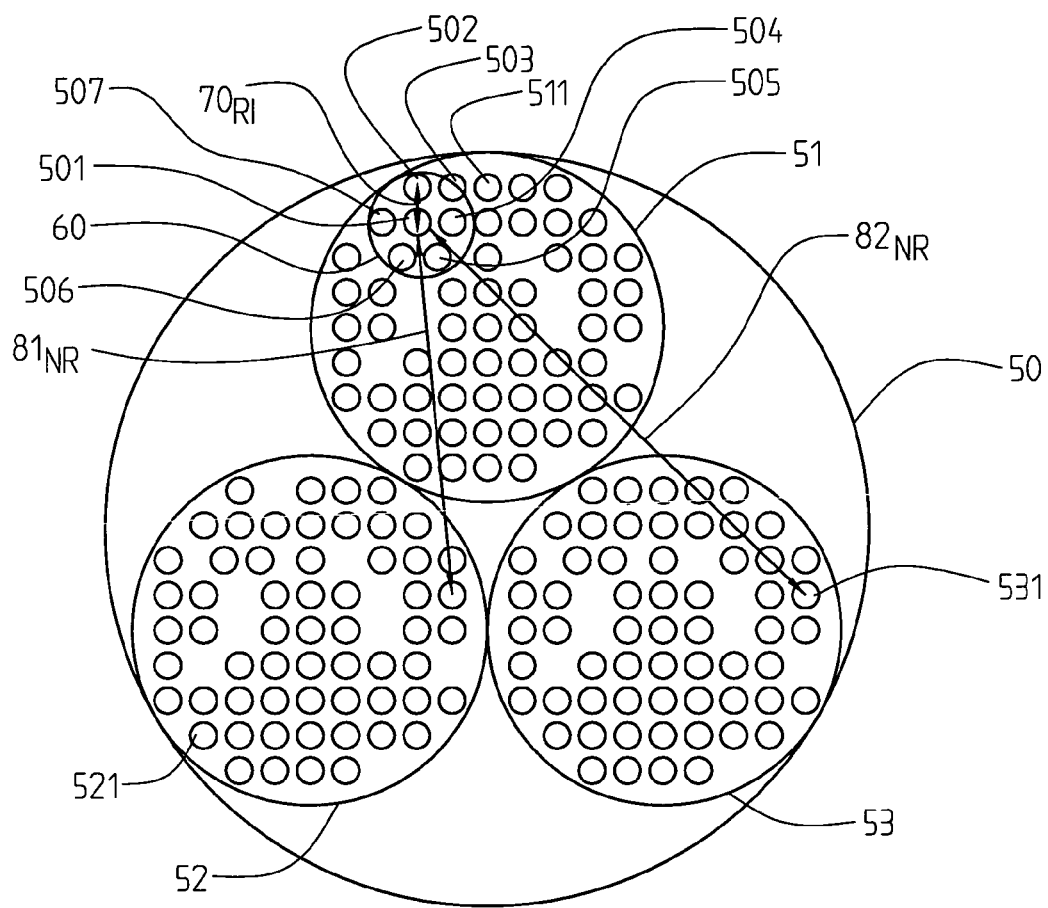
FIG. 2 illustrates an example of a copper access cable in cross-section.

In order to explain the concept of the present invention, reference is made to FIG. 2 which shows an exemplary, simplified cross-section of a copper access cable 50. The copper access cable 50 consists of several cable binders 51, 52, 53 which are grouped together, for example as shown in FIG. 2. Each cable binder 51, 52, 53 contains several twisted-pair lines, e.g. 511, . . . ; 521, . . . ; 531, . . . , for example 100 lines. Of course an access cable may comprise any other relevant number of cable binders, as well as a cable binder may comprise any appropriate number of lines, more or less than 100. Normally a copper access cable 50 is manufactured in order to minimize cross-talk. This means that it is attempted to keep a twisting between lines all along the cable. This is not illustrated in the figure since it should be clear to any one skilled in the art.

According to the present invention it has been realized that a line is effectively disturbed only by some so-called neighbouring lines. It is then assumed that a particular line only is affected by the cross-talk signal from a limited set 60 of lines, for instance within a radius, in the figure illustrated as $70_{RI}$. The radii $81_{NR}$, $82_{NR}$ point at typically non-relevant lines. Relevant line sets comprise the determined interference relevant lines for each a particular line. In FIG. 2, for line 501, the determined interference relevant line set consists of lines 502, 503, 504, 505, 506, 507. The properties of a relevant line set depend on the specific line of interest for optimization. A relevant line set for a specific line may consists of lines in the same cable binder only. It may however also consist of one or more lines in another, adjacent cable binder. The main, basic principle is that the relevant interfering, possibly neighbour, lines are identified. State of the art algorithms, for example DSM algorithms, do not take into account the distribution of line sets, also called pair-wise relations, during the optimization process, nor any identification of specific lines of interest whatsoever. Consequently known resource management methods based on DSM algorithms are always based on the total number of lines, which means that a tremendous amount of computations have to be performed, a large number of which, according to the present invention, are found to be totally irrelevant and unnecessary.

For state of the art solutions, this also means that unnecessary updates of users or lines are performed. Such a case occurs when the state of a line has to be updated, for example transmission PSD level change. Then all other lines in the binder must be updated as well, not only the lines which actually predominantly are affected by the cross-talk of said line. These serious drawbacks are overcome through implementation of the concept of the present invention.

Figure 3:
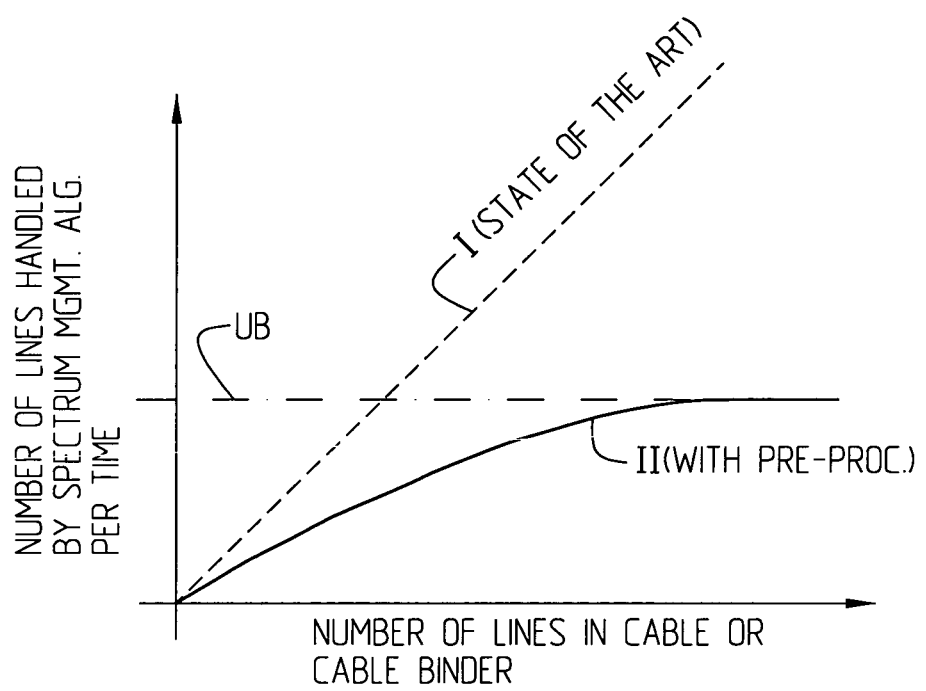
FIG. 3 is a diagram indicating how the number of lines on which DSM is applied depends on total numbers of lines according to the state of the art and according to the inventive concept respectively.

FIG. 3 is a schematic diagram illustrating a number of lines to be handled by a spectral management algorithm per unit of time as a function of the number of lines in a cable or cable binder according to a state of the art solution (I) and according to the inventive concept (II). The number of lines to be processed according to the state of the art increases in proportion to the number of lines in the cable or in the binder, whereas according to the present invention, it has been realized that there is an upper bound limit in the number of users that actually need to, and should be, taken into account in the spectrum optimization for a specific line, by means of e.g. a DSM algorithm, since only, for each line, the respective relevant line set will contribute, or is to be taken account of. This clearly illustrates the advantage of implementing the inventive concept, and the larger the number of lines that can be practically handled by e.g. DSM, the higher the gain compared to the state of the art system.

For a better understanding of the present invention, application of DSM algorithms on a copper access binder consisting of N lines equipped with DSL transceivers will first be described. It is assumed that each transceiver employs discrete multitone modulation DMT and operates over a twisted-pair line with K independent sub-channels, also called tones or frequencies. As mentioned in the background section and illustrated in FIG. 1B, a channel matrix H characterizes the cable. Each channel vector $\bar{h}_{n,m} = [h_{n,m}^1, h_{n,m}^2, \ldots, h_{n,m}^K]$ represents the transfer function of the channel from a transmitter m to a receiver n over the frequency band (tones or frequencies). When m=n, the diagonal vectors $\bar{h}_{1,1}, \bar{h}_{2,2}, \ldots, \bar{h}_{N,N}$ correspond to the direct transfer functions of the twisted-pair lines. Similarly the off-diagonal vectors $\bar{h}_{n,m}$ for n≠m correspond to the FEXT/NEXT transfer functions between the lines.

DSM uses PSD level optimization to assign a transmit PSD for each user in order minimize cross-talk interference. The assignment of transmit PSD is conducted according to a set of predefined criteria and constraints, for example to maximize user rates under power limitation, which constitutes a spectral management problem, which can be formulated as a maximization problem of the weighted-rate-sum, subject to a power constraint per user or per line, i.e.:

$$\text{maximize} \sum_{n=1}^{N} w_n R_n$$

$$\text{subject to} \sum_{k=1}^{K} s_n^k \leq P_n^{max}, \text{ for } n = 1, \ldots, N,$$

wherein:
$w_n$ is the non-negative constant for line n that provides different priorities (or weights) for lines,
$R_n$ denotes the total bit rate of line n,
K denotes the total number of frequencies used,
$s_n^k$ is the transmit power on frequency k for line n,
$P_n^{max}$ is the total available power for line n, and
$b_n^k$ represents the number of bits assigned on frequency k for line n.

The total data rate for a line n can be derived as $$R_n = f_s \sum_{k=1}^{K} b_n^k,$$

with $f_s$ as the symbol rate. Other pre-defined criteria and constraints are also possible.

The bit allocation per tone (frequency) can then be expressed as:

$$b_n^k = \log_2 \left[ 1 + \frac{s_n^k |h_{n,n}^k|^2}{\Gamma \left( \sigma_n^k + \sum_{m \neq n} s_n^k |h_{n,m}^k|^2 \right)} \right],$$

wherein $\Gamma$ is the signal-to-noise (SNR) ratio, which is a function of the desired bit error rate (BER), typically $10^{-7}$, $\sigma_n^k$ is background noise power on frequency k at receiver n.

The above optimization problem can be seen as a search to find a set of non-negative $s_n^k$ values under a trade-off between maximizing the data rate and avoiding cross-talk interference.

Since DSM is rather complex, various optimization approaches have been implemented, see for example Tsiaflakis P., Moonen M., "Low-Complexity Dynamic Spectrum Management Algorithms for Digital Subscriber Lines", in Proc. of the IEEE International Conference on Acoustics, Speech and Signal Processing (ICASSP 2008), Las Vegas, USA, March 2008. Several algorithms have been introduced in attempt to solve the spectrum management problem as referred to above. One example is an iterative spectrum balancing (ISB) algorithm, see for example R. Cendrillon and M. Moonen, "Iterative spectrum balancing for digital subscriber lines," IEEE International Communications Conference (ICC), May 2005. Another class of Spectral Management methods is often referred to as Vectoring or DSM Level 3, see for example "Vectored DSLs with DSM: The road to Ubiquitous Gigabit DSLs", J. Cioffi et. al., WTC 2006; G. Ginis and J. M. Cioffi, "Vectored transmission for digital subscriber line systems,"

IEEE Journal. Selected Areas in Comm., Vol. 20, no. 5, pp. 1085-1104, 2002 or "MULTI-USER SIGNAL AND SPECTRA CO-ORDINATION FOR DIGITAL SUBSCRIBER LINES", Chapter 4 and 5, PhD-Thesis, Raphael Cendrillon, KATHOLIEKE UNIVERSITEIT LEUVEN, 2004.

Optimization using ISB is summarized by means of the following algorithm (1), which is given as a pseudo code for the ISB algorithm and where the channel matrix represents FEXT:

$$\text{repeat} \\ \begin{cases} \text{for } n_{opt} = 1\text{: } N \quad // n_{opt} \text{ is the line index to be optimized} \\ \quad \text{repeat} \\ \quad // \text{ fix the current values } s_m^k, \forall m \neq n_{opt} \\ \quad N \begin{cases} \text{for } k = 1\text{: } K \\ \quad // \text{ call function to calculate } L_k. \\ \quad K \begin{cases} \text{Calculate } L_k(H^k, s_n^k)\{ \\ P_{level} \quad b_n^k = \log_2 \left[ 1 + \frac{s_n^k |h_{n,n}^k|^2}{\Gamma\left(\sigma_n^k + \sum_{m \neq n} s_m^k |h_{n,m}^k|^2\right)} \right] \\ \quad N \\ \quad \} \\ \quad s_{n_{opt}}^k = \text{argmax} L_k \end{cases} \\ \quad \text{end} \\ \quad \text{until convergence} \\ \text{end} \end{cases} \\ \text{until convergence}$$

In order to determine the best PSD (Power Spectrum Density) distribution for N lines, the ISB has a complexity of $O(P_{level} KN^2)$, where $P_{level}$ is the total number of possible power levels. The desired PSD value $S_{n_{opt}}$ is a result of the maximization of $L_k(H^k, s_n^k)$, a term in the ISB algorithm that is to be maximized and which is a function of $P_{level}$, N and of the bitloading giving $b_n^k$. The algorithms of the convergence loops are normally implementation-dependent. The computation of $L_k$ involves the determination of $b_n^k$ for all lines N. This computation occurs under the condition that $s_{n_{opt}}^k$ can assume any PSD level, i.e. a total of $P_{level}$ possible PSD levels are considered, and the level that maximizes $L_k$ is chosen. Optimization is done for one user at a time, i.e. in the algorithm one line $n_{opt}$ is optimized at a time. Then, for each line, all considered frequencies (k=1, ..., K) are gone through for a fixed, current $s_n^k$.

To reduce the complexity of ISB or any other appropriate algorithm used in resource management, particularly any DSM level-2 algorithm, according to the present invention a determination is introduced according to which, for each respective of said lines, a relevant line set comprising interference relevant lines for said respective line, is to be identified. For DSM level-3 algorithms, such as vectoring algorithms, a corresponding procedure is carried out.

In an advantageous embodiment the determination comprises definition of a criterion, which comprises at least one decision variable, and which criterion is related to noise power spectral density level and indicates e.g. an acceptable or a non-acceptable level (e.g. cross-talk level) for each respective line on each respective frequency thereof within a frequency band of interest. Then, for each other line (and frequency), it is examined if the criterion is met in respect of said respective line. Those lines for which the criterion is not met, or met depending of how the criterion is formulated, are identified as lines belonging to the interference relevant line set for said respective line. This means that for other lines, if, for a respective frequency, their cross-talk is higher than an acceptable level, such lines are included in the relevant line set. The criterion can be formulated in different manners.

In a particular embodiment the at least one decision variable consists of a first decision variable representing background noise power on a respective frequency at a receiver of a respective line n and optionally or preferably an optional, selectable first criterion margin parameter. This first criterion margin parameter is a tolerance value, for example expressed in dB. It may for example be 2, 3 or 4 dB. It should be clear that these figures are merely given for exemplifying reasons, the criterion margin parameter is implementation dependent and can be lower as well as higher.

In an alternative embodiment the at least one decision variable consist of a second decision variable which comprises the sum of the background noise power of a respective line n to which is added the sum of FEXT/NEXT from all other lines except another particular line m to which a signal is transmitted over a channel on a respective frequency at a receiver, and a selectable second criterion margin parameter. The second criterion margin parameter is also a tolerance value which can be selected and which is implementation dependent.

Particularly the defining step comprises performing a preprocessing algorithm to establish, for a respective line n, if a transmitted signal on another line, here called m, over a channel results in FEXT/NEXT exceeding the defined decision variable, preferably including the selectable first criterion margin parameter. If yes, indicating the line m as forming part of the relevant line set for said respective line n, and repeating these steps for each other line of the cable binder or cable and for each respective frequency thereof. These steps are then repeated for each line in the cable binder or cable, to find the relevant line sets for all respective lines.

In an alternative embodiment the establishing step comprises, establishing, in a first establishing sub-step, for the respective line n, if a transmitted signal on another line over a channel results in FEXT/NEXT exceeding the defined first decision variable, optionally but preferably with a selectable first criterion margin parameter added, and establishing, in a second establishing sub-step, for the respective line n, if a transmitted signal on another line over a channel results in FEXT/NEXT exceeding a defined second decision variable, preferably with a selectable second criterion margin parameter added. Thus, in this case two criteria are implemented, based on a first and a second decision variable respectively, wherein most preferably for each a respective criterion margin parameter comprising a tolerance value is added.

The determining step then comprises applying a first and a second pre-processing algorithm for performing the first and second establishing sub-steps. Alternatively it comprises applying a common pre-processing algorithm for the first and the second establishing sub-steps. Particularly the pre-processing (depending on if only one decision variable is used, or if two decision variables are used) comprises one common algorithm or separate algorithms. The decision variables may be used to determine the respective relevant line set line by line or in parallel for a plurality of, or all, lines in the cable binder or in the cable.

In one embodiment the defining step comprises defining, as a criterion, a cross-talk filter criterion corresponding to the first decision variable as referred to above and establishing background noise levels for each respective line (and for each frequency) at the respective receiver of said line, from all other lines, and frequencies thereof, in a cable or cable binder containing said line.

Figure 1A:
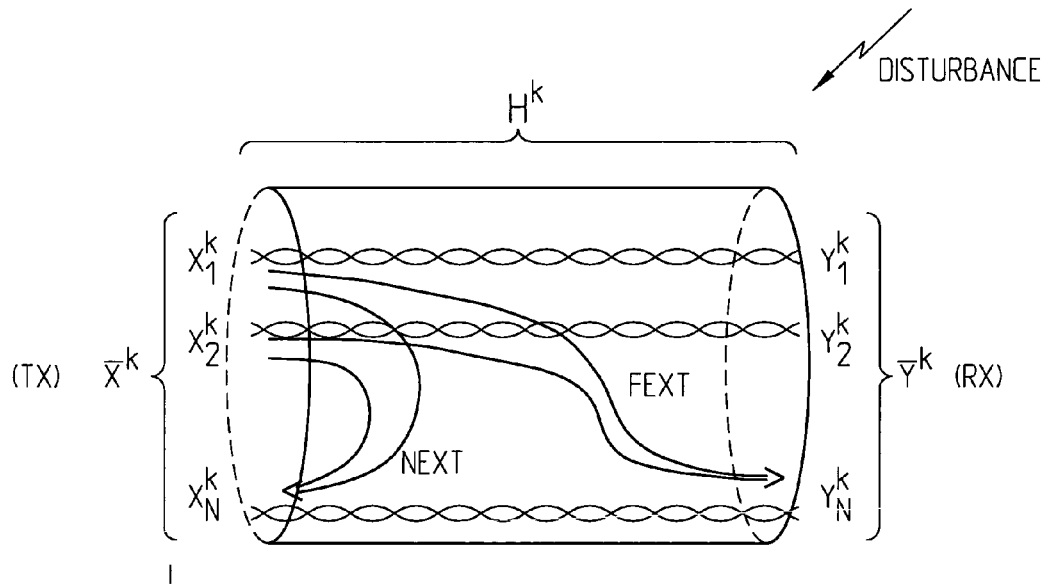
FIG. 1A illustrates DMT transmission, and FEXT and NEXT interference produced on a copper access binder.
Figure 1B:
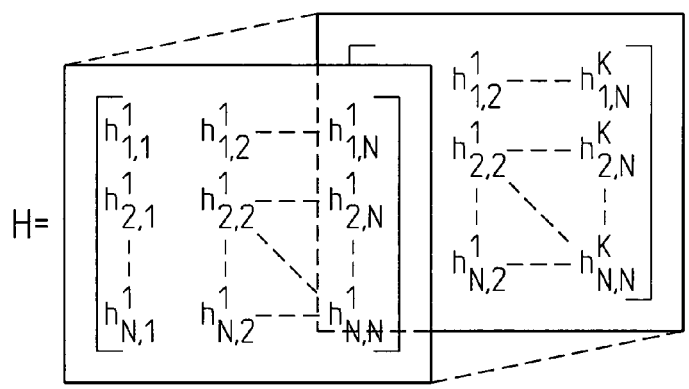
FIG. 1B illustrates a channel matrix.

Most particularly, relevant for any one of the embodiments referred to above, the determining steps comprises using channel matrix information H (mentioned previously) to derive, for each respective line, the relevant line set, i.e. the first and/or second criteria (depending on which is applicable) is/are based on or use channel matrix information characterizing a cable binder (or cable) and representing both direct and FEXT/NEXT coupling transfer, cf. FIG. 1B.

Channel matrix information can be obtained in different manners. In one embodiment channel matrix information is available in storing means, for example a data base or any other information holding means, which can be accessed. Channel matrix information may e.g. have been required for some other purpose or it may be channel matrix information established for the purpose of carrying out a method according to the invention. It is also possible to measure or assume channel matrix information in any appropriate manner. WO 2008/030145 A1 describes a method for automatically determining a FEXT/NEXT transfer function, i.e. of acquiring or measuring channel matrix information. This method may with advantage be used.

Since, according to the present invention, it has been realized that not all lines are directly coupled via the FEXT channels and for some lines only certain frequencies have significant FEXT coupling, irrelevant FEXT coupling values are not necessary for the DSM algorithm. To establish irrelevant coupling values or matrix elements, the first and/or second decision variables and a criterion or criteria based thereon as discussed above, is/are used, in one or more pre-processing algorithms, to derive the relevant line sets for each line in a binder or in a cable. Thus, according to the invention, for each line, and for each frequency thereof, it is to be determined which channel matrix elements that actually are relevant and need to be taken into account in subsequent DSM processing.

According to a first embodiment the determining step comprises using a first decision variable representing background noise power on a respective frequency at a receiver of respective line n and a selectable first criterion margin parameter, as also mentioned earlier. In this embodiment it is implemented by means of a pre-processing algorithm through which the channel matrix elements needed for a subsequently implemented DSM optimization process are found. Thus, relevant line sets are determined in order to optimize each specific line. In a simplified manner, the relevant line set is interpreted as comprising the lines inside the circle with radius $70_{R1}$ in FIG. 2. In this embodiment a pre-processing algorithm is implemented which can be said to consist of a cross-talk filter criterion based on a pre-defined or measured background PSD noise level $\sigma_n^k$. This means that the relevant cross-talk coupling values are identified by means of the algorithm. A cross-talk filter criterion can be formulated in different manners. An advantageous criterion involving the first decision variable is, according to the invention:

$\Delta_1 + s_m^k \cdot |h_{n,m}^k|^2 < \sigma_n^k$, wherein $\Delta_1$ is the optional or selectable first criterion margin parameter, i.e. a tolerance value in dB, for example 3 dB, $s_m^k$ is the transmit power on frequency k for line m, $|h_{n,m}^k|^2$ denotes the FEXT/NEXT coupling component, and $\sigma_n^k$ represents a reference noise power (measured, retrieved or assumed) on frequency k at far-end/near-end receiver of line n.

According to this first criterion an inequality is given and $|h_{n,m}^k|$ should be ignored if it is fulfilled. According to this first criterion a transmitted signal $s_m^k$ over a FEXT channel $|h_{n,m}^k|^2$, which results in a received cross-talk below the background noise $\sigma_n^k$, should not be taken into account by the DSM optimization, i.e. it does not belong to the relevant line set for line n.

A pseudo-code (algorithm 2) describing the pre-processing algorithm according to this embodiment is shown below and is actually used to determine the total number of disturbing lines (N') and the line index (IndN'), i.e. the addresses of each one of these disturbing lines, for each line and on each frequency. This means that for each respective line, for all frequencies and for all other lines, the criterion above is used to establish which matrix elements that are to be considered (or not considered).

algorithm 2:

```
// loop over the total number of tones K.
for k = 1 : K
    // loop over the total number of users N (along the columns
    of each matrix H^k ).
    for m = 1 : N
        // loop over the total number of users N (along the rows
        of each matrix H^k ).
        for n = 1 : N
            if σ_n^k - s_m^k · |h_{n,m}^k |^2 > Δ, ∀ m ≠ n
                |h_{n,m}^k|^2 = 0. // matrix element not to be considered.
            end
        end
    end
    calculate N'       // the total number of disturbing lines.
    calculate IndN'    // line index for each line n on frequency k.
end
```

Thus, the channel information provided in the channel matrix H is analyzed according to the filter criterion (or criteria) in order to provide a matrix containing only relevant, here FEXT, coupling data. The direct channel information is preferably not affected or modified. Here implementation of the algorithm provides information about each user/line in a cable or cable binder based on this analysis of the channel matrix. This information is stored in the matrices N' and IndN' as referred to above which corresponds to the determination of the relevant line set of disturbing lines or interference relevant lines for each user or each line.

In one embodiment the determining step is performed by determining means adapted to, for each respective line, determine a relevant line set comprising the interference relevant lines for said line. The determining means may comprise channel matrix information establishing means and calculating means, $4_0$ (FIG. 4) or 3, 4 (FIG. 5). Different implementations are possible and the respective means may be included in a network management center $3_0$, in a spectrum management center SMC, see FIG. 5, or be provided in any other appropriate manner.

Figure 4:
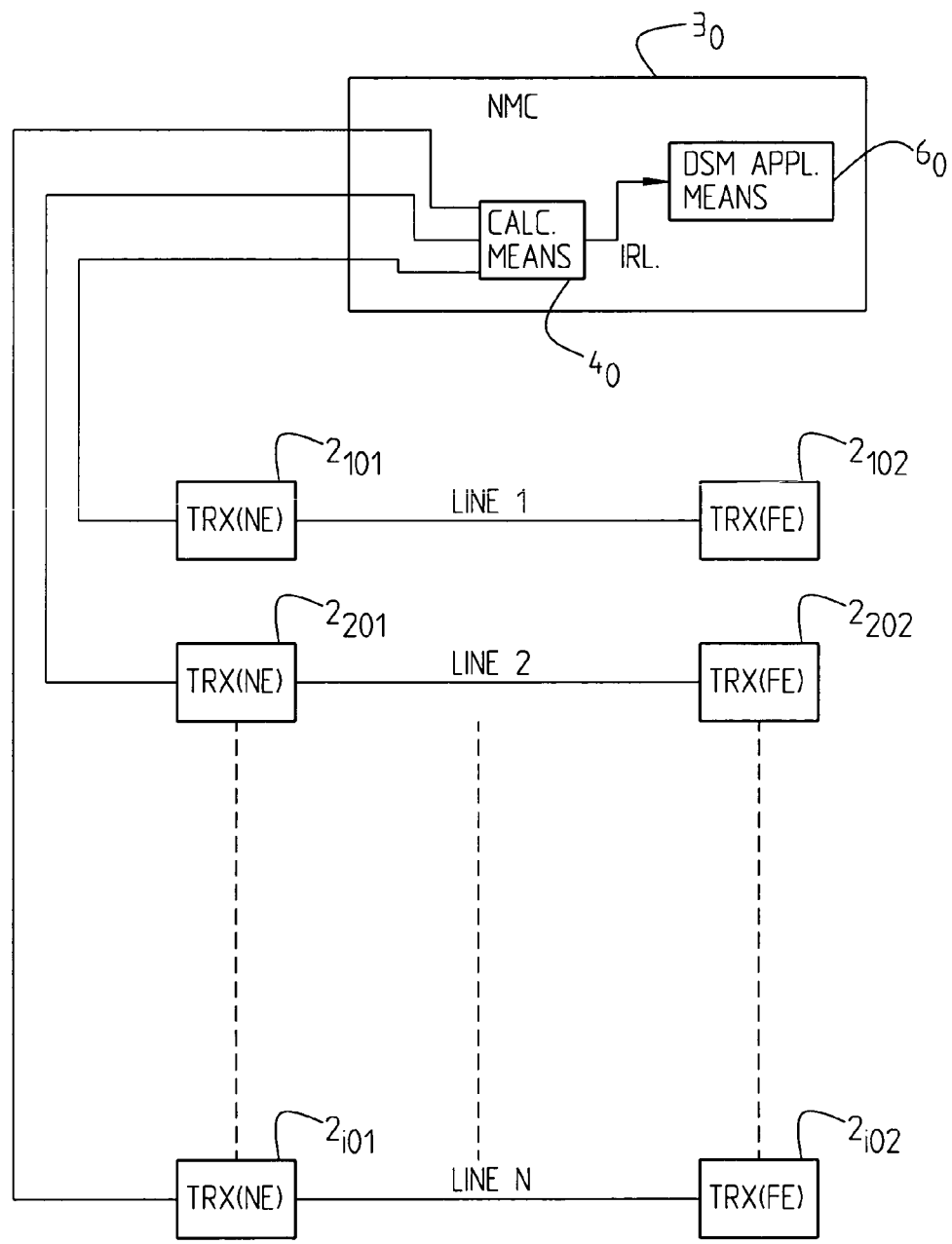
FIG. 4 is a block diagram of a system according to the present invention.
Figure 5:
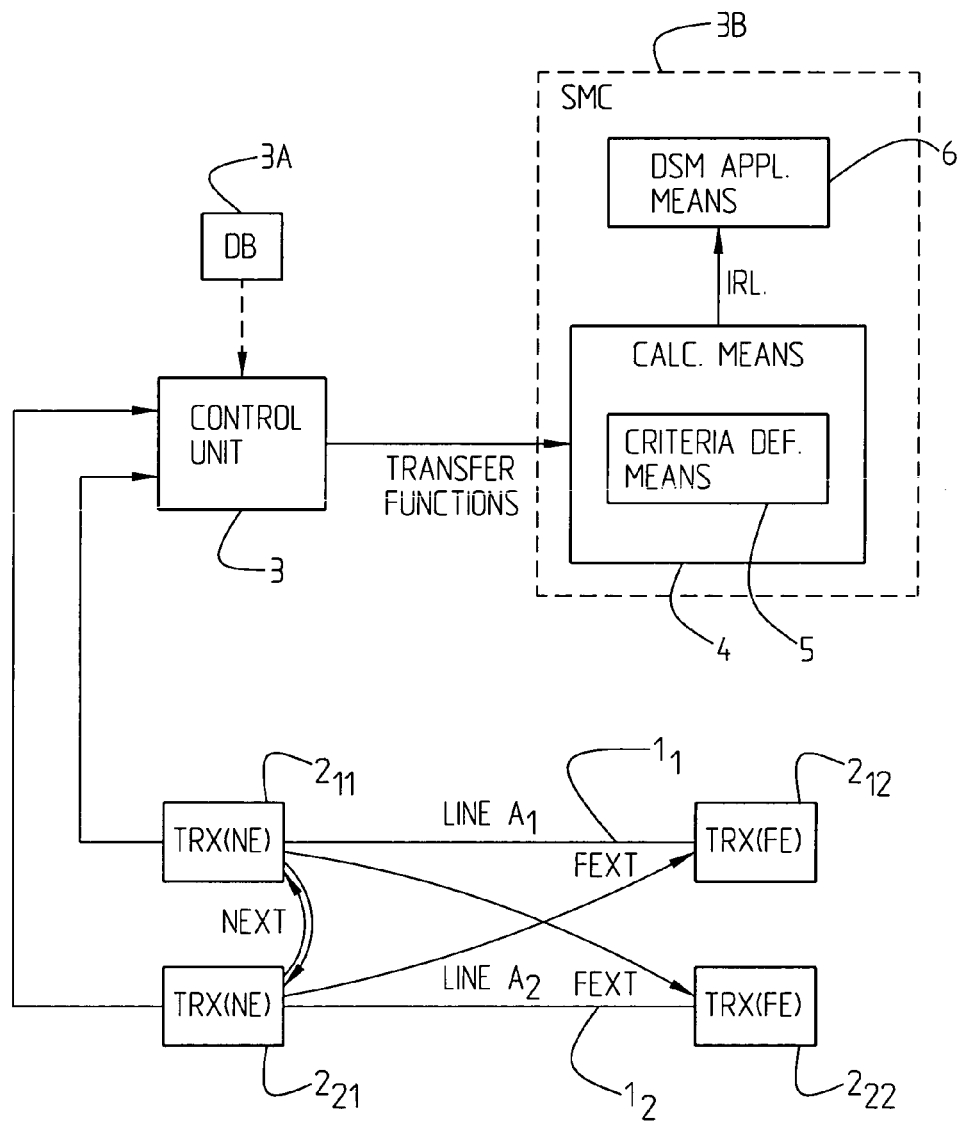
FIG. 5 is a block diagram that illustrates an alternative implementation of a system according to the present invention.

FIGS. 4, 5 show two schematical implementations of a system according the present invention which will be discussed further below.

Figure 6A:
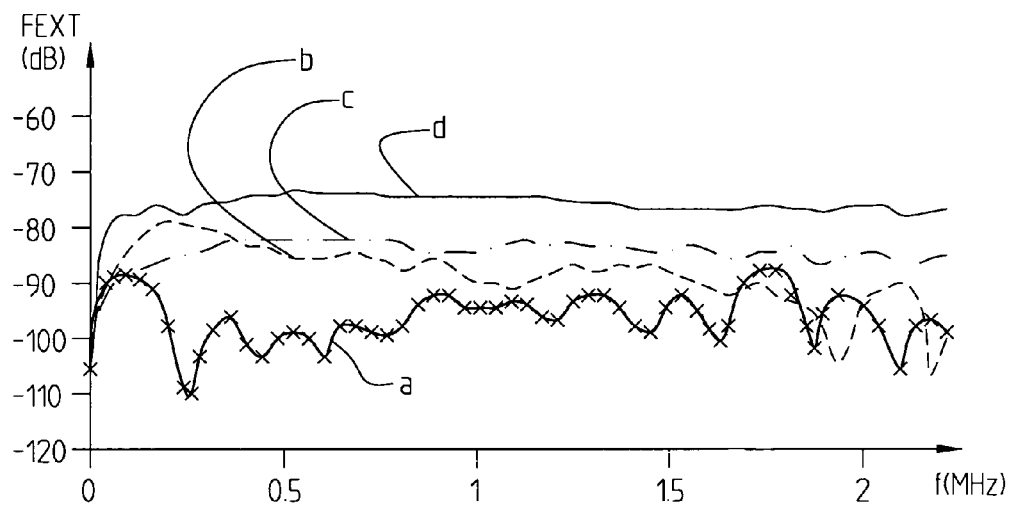
FIG. 6A is a diagram that illustrates FEXT as a function of frequency, i.e. measured FEXT coupling channels without pre-processing according to the present invention.

FIG. 6A shows measured FEXT coupling channels a, b, c, d on a real cable binder, therefore it scales to the cross-talk (in dB) experienced by a receiver (transceiver) from other (far-end) transceivers as a function of frequency in MHz.

Figure 6B:
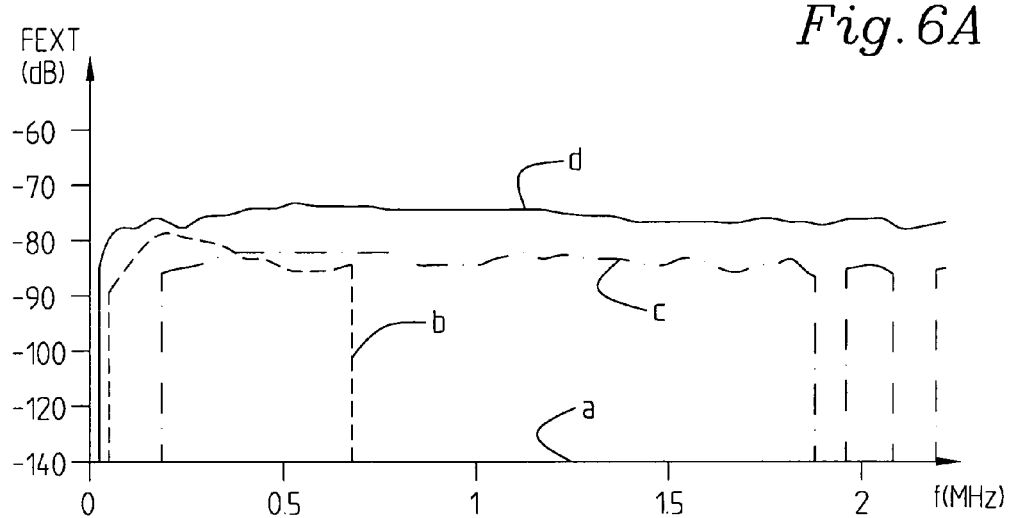
FIG. 6B is a diagram similar to FIG. 6A but after application of pre-processing, i.e. finding of relevant line sets.

FIG. 6B shows the equivalent FEXT coupling channels after application of a pre-processing algorithm (based on a first criterion) as discussed above with the first criterion margin 3 dB and $\sigma_n^k = -120$ dBm/Hz. For channel a, 100% of the frequencies (tones) are filtered out (need not be considered or used), for frequency or coupling channel b, 73% of the frequencies are filtered out, for coupling channel c, 18% of the tones or frequencies are filtered out, and for channel d, 2% of the frequencies are filtered out.

Figure 7A:
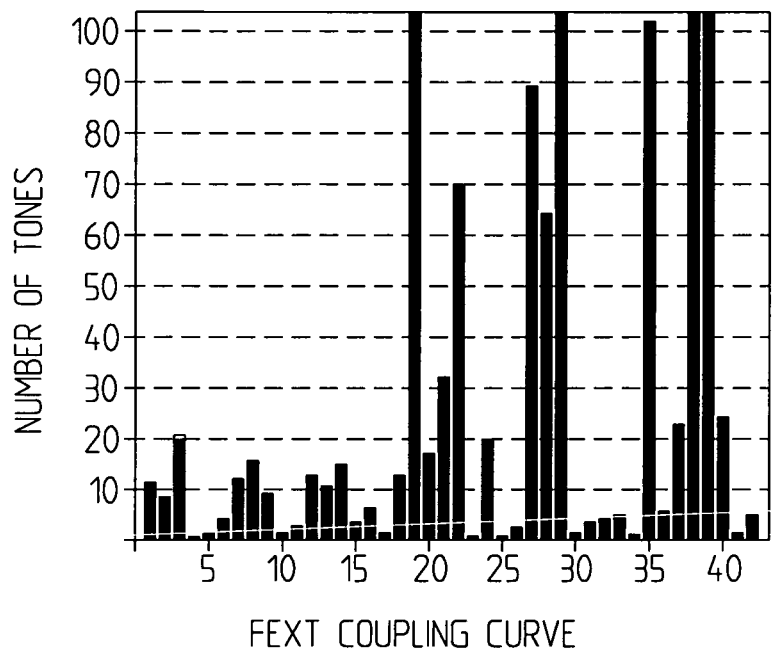
FIG. 7A is a diagram illustrating total number of filtered tones per FEXT coupling curve.

FIG. 7A relates to an in practice measured scenario for N=7 lines or users and K=512 frequencies or tones. The total number of filtered out frequencies per FEXT coupling curve (i.e. per FEXT measurement) are shown in FIG. 7A.

Figure 7B:
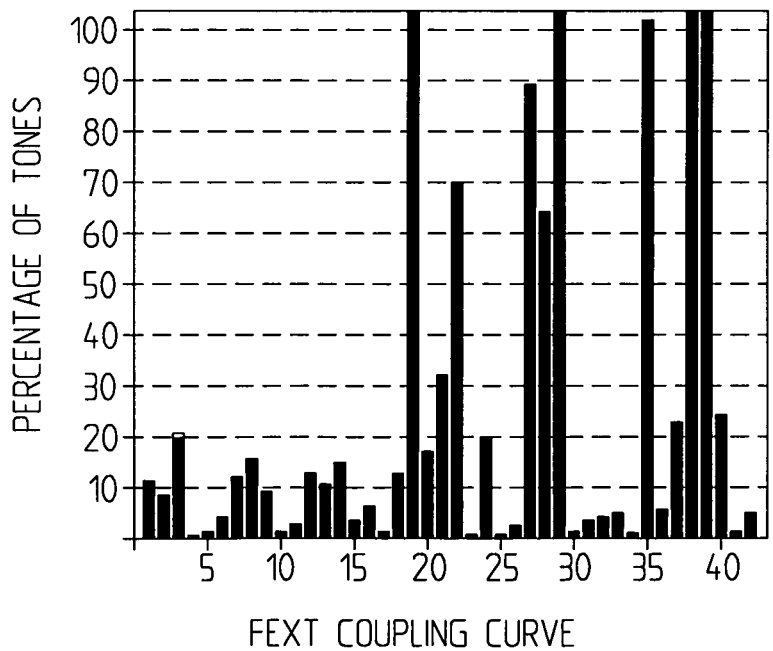
FIG. 7B is a diagram as in FIG. 7A but shows the percentage value of filtered tones per FEXT coupling curve.

FIG. 7B illustrates the value of filtered frequencies per FEXT coupling curve expressed as percentages of frequencies. For N lines there are (N−1)×N possible cross-talkers, i.e. 7×6=42 cross-talk channels. In a conventional ADSL2+ network there are 512 frequencies or tones which will require a large number of calculations without pre-processing according to the present invention. In for example VDSL2 there may be more than 4.000 tones or frequencies, which means that the inventive concept will be able to drastically reduce computational complexity for subsequently used resource management algorithms.

In FIGS. 7A and 7B, for example for coupling curve (channel) 19, all frequencies are irrelevant, as well as for channels (coupling curves) 29, 38 and 39.

According to another advantageous implementation a second decision variable is used in a second criterion. The second or alternative FEXT-filter criterion is based on this second decision variable, which here consists of background noise plus the sum of cross-talk from, for a line n the other N-2 lines (of totally N lines), except line m. This can be formulated as:

$$s_m^k \cdot |h_{n,m}^k|^2 + \Delta_2 < \sigma_n^k + \sum_{\substack{v=1, v \neq n, \\ v \neq m}}^{N} s_v^k \cdot |h_{n,v}^k|^2, \forall m \neq n$$

According to this second criterion an inequality is given and $|h_{n,m}^k|$ should be ignored if it is fulfilled, i.e. considered line and frequency (matrix element) does not form part of the relevant live set for line n. $\Delta_2$ is a second margin criterion parameter and can be selected.

Preferably the sum above should exclude lines which are not active in order to prevent that more lines are filtered out than optimally, which means that the actual FEXT contribution would be over-estimated. $\Delta_2$ affects the trade-off between computational complexity and DSM performance.

In still another embodiment both the first and the second criteria are used, i.e. both the first criterion based on the first decision variable and the second criterion based on the second decision variable. As discussed above the algorithms can be implemented in separate calculating means or algorithm implementing means or in a common calculating or processing means, which may consist of hardware and/or software.

Once the relevant line sets are found, a resource management algorithm based on DSM, or vectoring, is implemented on these relevant line sets only, more specifically only on relevant frequencies of these lines (and not on all lines and frequencies).

A line is part of a relevant line set for another line (and frequency) if it has one or more frequencies for which the relevant criterion (or criteria) is met/not met (depending on formulation).

It should be clear that in the system disclosed in FIG. 4 only one calculating means $4_0$ is illustrated and it is supposed that either the first criterion using the first pre-processing algorithm is implemented by said calculating means, or the second criterion, or both. The calculating means $4_0$ may perform one pre-processing algorithm, related to the first criterion or the second criterion, or two algorithms. If two criteria are used it may contain a common calculating unit or two separate calculating units. Calculating means $4_0$ is here supposed to be included in a network management center NMC $3_0$. Here the NMC $3_0$ also encloses algorithm (e.g. DSM) application means $6_0$ adapted to implement the relevant resource management algorithms on the relevant line sets as output from the calculating means $4_0$.

The calculating means $4_0$ as well as the DSM application means $6_0$, or a DSM controller, which may comprise a computer system or control processor, may or may not be embedded into a DSLAM (Digital Subscriber Line Access Multiplexer) or a DSL access node or some other network element, in a smart modem, a dynamic spectrum manager, a DSL optimizer or a spectrum management center and/or a dynamic spectrum management center, DSM center (see FIG. 5), or any other suitable control device or entity including a computer system. Also the DSM application means may be a singular unit or a combination of components that are a computer implemented system, a device or combination of devices performing the particular algorithm, e.g. an ISB algorithm as discussed above.

FIG. 4 illustrates a plurality of lines, line 1, . . . , line i between Near End (NE) transceivers $2_{101}, 2_{201}, 2_{i01}$ and Far End (FE) transceivers $2_{102}, 2_{202}, 2_{i02}$. Transceivers $2_{101}, \ldots, 2_{i01}$ are connected to calculating means $4_0$ in NMC $3_0$. The calculating means $4_0$ are directly or indirectly connected to or comprise matrix establishing means (not shown) for somehow measuring, obtaining or providing general matrix information (transfer functions). General matrix information may also be available by means of a database, internally within NMC or externally of NMC. The interference relevant line sets IRL are, once established by the calculating means $4_0$, input to the (here) DSM application means $6_0$.

FIG. 5 schematically illustrates an alternative implementation wherein a control unit 3 and further establishing means are adapted to handle measurements for determining the transfer functions. Alternatively the control unit 3 is a means adapted to communicate with a database 3A holding channel matrix measurement data. The transfer functions are provided to calculating means 4 in which a criterion/criteria definition means 5 explicitly is indicated containing or being adapted to formulate the first and/or second criterion/criteria as discussed above. By means of pre-processing algorithms processed in the calculating means 4, the respective interference relevant line sets IRL are found, which are input to spectral management, e.g. DSM, processing application means 6, the functioning of which will be more thoroughly described below. In this particular embodiment it is supposed that the calculating means and the DSM application means 6 are provided in a spectrum management center SMC 3B. In still another embodiment the control unit 3 and optionally the database 3A are also included in SMC 3B.

Also in this embodiment the calculating means 4 may be adapted to handle the first and/or the second criterion by means of a common pre-processing algorithm or by means of separate algorithms. It is also possible to provide two distinct, separate, but communicating or connected calculating means (not shown).

With reference to FIG. 5 an embodiment for carrying out measurements to determine the FEXT/NEXT transfer function will also be briefly explained. For a particularly advantageous implementation a procedure as described in WO 2008/030145 can be used. However, also already available transfer matrix data can be used, obtainable from a database 3A for example. The control unit functionality may also be provided in SMC or even in the calculating means, externally thereof or in a separate unit. Any variation is in principle possible.

A DSM modem here comprises a transmitter and a receiver connected to the twisted-pair cable of a subscriber line through a so called hybrid circuit. On the central office (CO) side near end transmitters and receivers TRX (NE) $2_{11}$, $2_{21}$ and on the customer premises (CPE) far end transmitters and receivers (transceivers) TRX FE $2_{12}$, $2_{22}$ are shown. The transmission lines, here line $A_1$ $1_1$, line $A_2$ $1_2$, have a similar structure, for example unshielded twisted-pair copper wires. It is here supposed that line $A_1$ $1_1$ is "active". The CO side of the active line is connected to a first transmitter $2_{11}$ which generates a test signal that is applied to line $A_1$ $1_1$ in a first measuring phase 1. When transmitting a test signal through the first line $A_1$ $1_1$, the second line $A_2$ $1_2$ is free of any test or communication signal. A noise measurement is then carried out on this second passive or quiet line $A_2$ at both ends of the cable. After obtaining a noise value on the near end (CO side) and a noise value on the far end side (CPE side), the values are reported to central control unit 3. The central control unit 3 receives the measured values, performs necessary calculations and coordinates the measurement process.

In a second phase, the test signal is switched off so line $A_1$ is silent. Then line $A_1$ and line $A_2$ are both silent, i.e. free of any test or communication signal, and a noise measurement is carried out on the second passive line $A_2$ at both ends of the cable. Near end and far end noise values are then obtained, which are reported to control unit 3.

In a third phase NEXT and FEXT transfer functions are determined by the control unit 3. (It should be clear that in the present application there is no limitation to include both NEXT and FEXT transfer functions since they need not be used by the central control unit for the purpose of reducing FEXT only or NEXT only; normally only in embodiments where FEXT and NEXT are to be reduced or controlled.) The control unit 3 performs necessary calculations on the received and stored values of the preceding noise measurements and hence the FEXT/NEXT transfer function can be determined and transferred to the calculating means 4. If only one sub-carrier frequency is used in the test signal at a time, then the phases 1-3 have to be repeated for all sub-carrier frequencies. Otherwise a so called Reverb signal, a multi-carrier signal, can be used which contains all sub-carrier frequencies at the same time with substantially the same amplitude, but with a different phase which remains constant during measurement. Then the received signal will contain a line spectrum, i.e. the carriers remain orthogonal to each other. This merely relates to one advantageous implementation for establishing the transfer functions.

In one advantageous embodiment, the used algorithm is the DSM level 2 ISB algorithm. It should be clear that the invention is not limited to the ISB algorithm but is applicable to any algorithm used in DSM technology, most particularly to level-2 DSM, but also to level-3 DSM, such as vectoring.

The input of the relevant line sets reduces the complexity of the implemented DSM algorithm. Below is shown an ISB algorithm here using the matrices N' and IndN' which, as described above, refer to the total number of disturbing lines and their indices (addresses) respectively for each line n on frequency k. It should be noted that the computation of $L_k(H^k, s_n^k)$ is based on performing $N'^k_{n_{opt}}$ times the logarithm calculus of $b_n^k$ instead of N times.

ISB algorithm applied on pre-processed data only:

$$
\begin{aligned}
&\text{repeat} \\
&\quad \left\{ \begin{array}{l}
\text{for } n_{opt} = 1: N \quad //\, n_{opt} \text{ is the line index to be optimized} \\
\quad \text{repeat} \\
\quad\quad //\text{ fix the current values } s_m^k, \forall\, m \neq n_{opt} \\
\quad\quad N \left\{ K \left\{ \begin{array}{l}
\text{for } k = 1: K \\
\quad // \text{ call function to calculate } L_k. \\
\quad P_{level} \left\{ \begin{array}{l}
\text{Calculate } L_k(H^k, s_n^k)\{ \\
\quad b_n^k = \log_2\left[1 + \dfrac{s_n^k |h_{n,n}^k|^2}{\Gamma\left(\sigma_n^k + \sum_{m\neq n} s_m^k |h_{n,m}^k|^2\right)}\right] \\
\} \\
\text{calculate } s_{n_{opt}}^k = \mathrm{argmax}\, L_k
\end{array} \right. \\
\quad N'^k_{n_{opt}}
\end{array} \right. \right. \\
\quad \text{end} \\
\quad \text{until convergence} \\
\text{end}
\end{array} \right. \\
&\text{until convergence}
\end{aligned}
$$

The complexity of the ISB algorithm, if pre-processing according to the present invention is implemented, will be:

$$O\!\left(P_{level} \sum_{n=1}^{N} \sum_{k=1}^{K} N'^k_n\right),$$

wherein $N'^k_n$ denotes the number of users or lines considered in the optimization of line n on frequency k. Thus, the complexity of optimization algorithms (for DSM level-2 or level-3) is considerably reduced through the appropriate exploitation of channel information according to the present invention.

Figure 8:
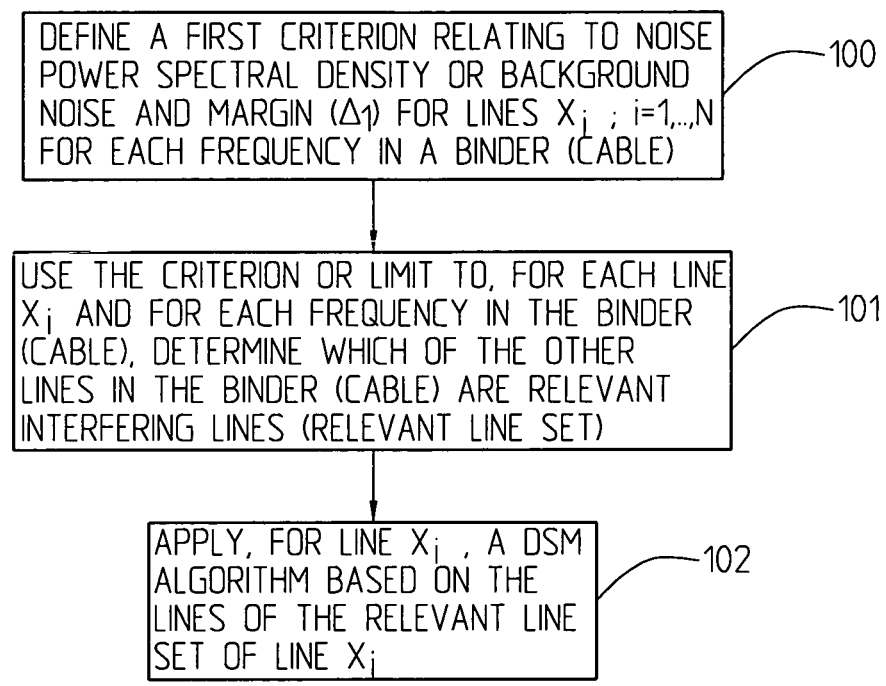
FIG. 8 is a flow chart describing the procedure according to the invention in general terms.

FIG. 8 is a very schematical flow diagram describing the procedure of the present invention. The pre-processing is here based on application of a first criterion only, based on a first decision variable and a first criterion margin parameter. First it is supposed that a first criterion relating to power spectral density or background noise to which is added a margin parameter ($\Delta_1$) is defined for a plurality of lines $x_i$ comprising all or some of the lines in a cable binder or in a cable, 100. The first criterion based on background noise and margin is used to, for each respective line $x_i$ in the cable binder or cable, determine which of the other lines in the binder or in the cable that are relevant interfering lines for said respective line $x_i$, i.e. to find the respective relevant line set for line $x_i$, 101.

For each line $x_i$, a DSM algorithm is then applied based only on the lines of the relevant line set of line $x_i$, 102. This means that the algorithm does not unnecessarily consider lines which do not meet the criterion.

For the lines, the criterion is applied on each frequency of the lines such that, for interference relevant lines, only the relevant frequencies need to be used in subsequent resource management. In other words, a line is considered to be an interference relevant line for another line only if one or more of its frequencies interfere with said other line (depending on the criterion). It should be clear that the functioning would have been the same if instead of the first criterion the second criterion were used, the only difference being that the decision variable is different. The procedure is also similar if both the first and the second criteria are used, in parallel or consecutively.

Figure 9:
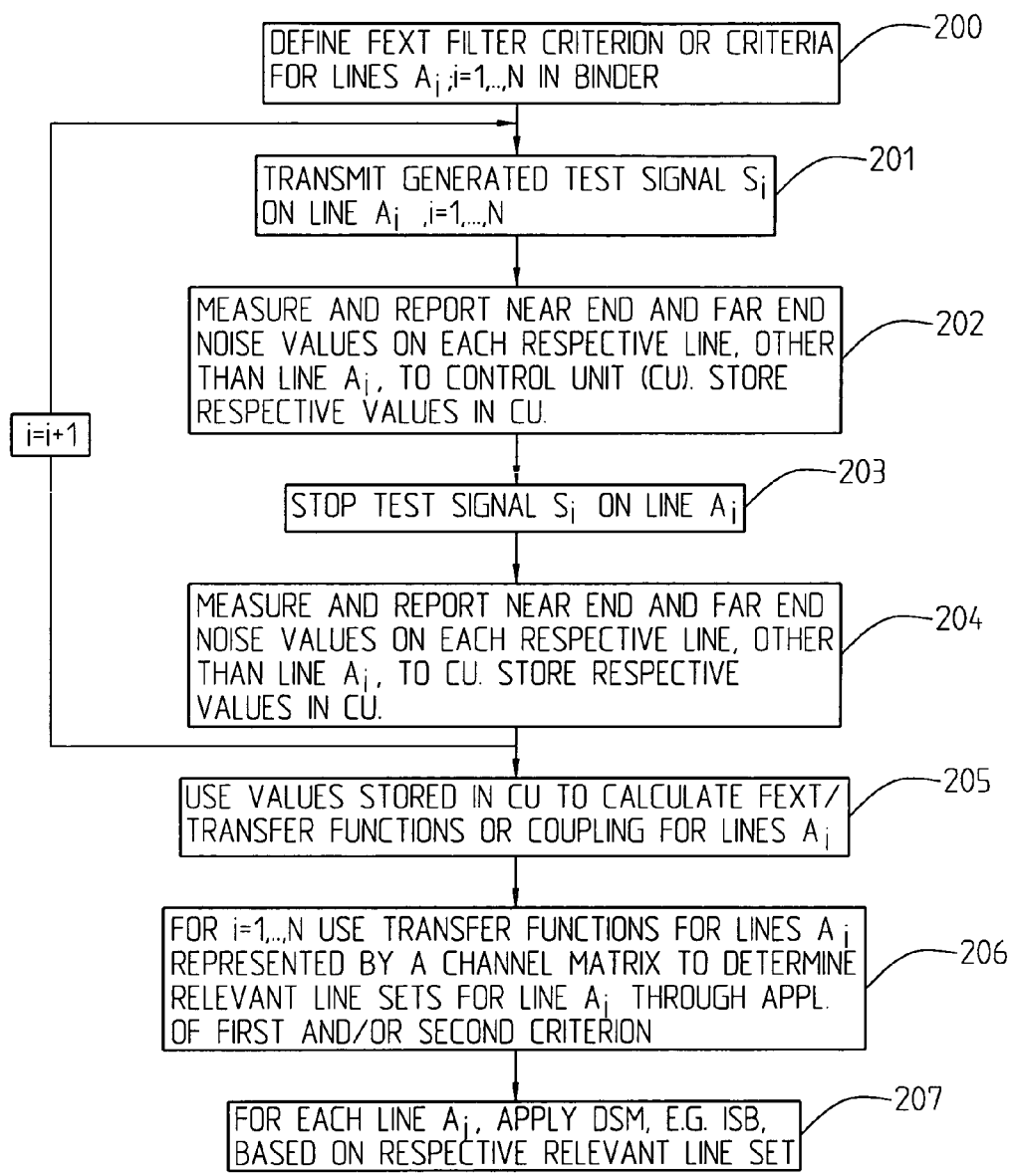
FIG. 9 is a flow chart describing the inventive procedure somewhat more in detail for a particular embodiment.

FIG. 9 is another schematical flow diagram describing one implementation of the present invention wherein the channel matrix is measured. It supposed that a FEXT-filter criterion is defined for lines $A_i$, i=1, ..., N in a cable binder. The criterion is here the first and/or the second criterion referred to earlier, 200. It should be clear that this step could be performed at a later stage, for example after step 204 or step 205. To establish the transfer functions, a generated test signal $S_i$ is transmitted on line $A_i$, 201. Near and far end noise values are measured on each respective line, other than line $A_i$, and then reported to a control unit CU which stores the respective values, 202. Then the test signal $S_i$ on line $A_i$ is stopped, 203. New measurements are done to measure near and far end noise values on each respective line, other than line $A_i$, and reported to CU wherein the respective values are stored, 204. This is repeated for each line (and each frequency). Subsequently the values stored in CU are used to calculate FEXT/NEXT transfer functions for lines $A_i$, 205. These transfer functions for lines $A_i$, represented by a channel matrix, are used to determine the relevant line sets for line $A_i$ through application of the relevant, first and/or second, criterion, 206. For each line $A_i$, an algorithm, for example ISB, is then applied on the respective relevant line sets, 207 (only relevant matrix elements are involved in the calculations).

It is an advantage of the invention that inclusion of unnecessary channel matrix elements will not take place and they will hence be disregarded in the resource optimization (management) process, e.g. based on DSM technology. Thus, pre-processing according to the invention eliminates inclusion of such elements which practically would correspond to multiplications by zero or additions of zero elements. It is also an advantage that the complexity is only as high as required by each specific scenario and the reduction is normally the more significant the higher the number of users or lines and tones (frequencies), e.g. for VDSL2 with many lines. It is also an advantage that it permits application of algorithms (e.g. DSM level-2 or level-3 technology) also when there is a large number of users, particularly simultaneous users. Conventionally algorithms used in DSM have an acceptable performance only for 7-10 users. It is also an advantage that convergence of such algorithms can be speeded up and it automatically employs an upper bound on complexity of the algorithms. Particularly the number of relevant cross-talking lines is naturally limited due to binder geometries and cable constructions and the complexity will be decoupled from the number of lines in a cable. It is also an advantage that unnecessary updates of users on lines can be prevented. For example, when a state of a line must be updated, for example due to a change in transmission PSD level, earlier all the other lines in the cable or binder had to be updated as well. According to the present invention only the relevant line set that actually is predominantly affected by the cross-talk needs to be updated. It is also an advantage that the complexity will be decoupled from the overall number of lines in a cable and instead it is virtually limited to only for example 5-15 lines in any cable (or cable binder) independently of the real number of lines in the cable (binder). Although the invention mainly has been discussed with relevance to FEXT, it should be clear that it is also or additionally applicable for NEXT or other relevant cross-talk phenomena.

The invention is not limited to the specifically illustrated embodiments, but can be varied in a number of ways within the scope of the appended claims.

The invention claimed is:

1. A method for managing transmission resources in a digital communication system comprising an access network, including a DSL system, and implementing resource management to reduce impairments, including cross-talk interference, in a metal access cable or cable binder, of the access network, comprising a number, N, of lines, the method comprising:
    at a processor, executing instructions stored in a memory to carry out acts comprising:
        determining, for each respective of said lines, a relevant line set including only interference relevant lines for said respective line,
        applying resource management, of said lines N, using one or more algorithms based on the determined relevant line sets for said respective lines,
        defining a criterion comprising at least one decision variable, relating to a noise power spectral density, and indicating a level of acceptance for the respective line on each respective frequency within a frequency band of interest, with respect to said decision variable,
        examining, for each respective line, if the criterion is met in respect to each other line,
        identifying the lines for which the criterion is met as lines belonging to the interference relevant line set for said respective line.

2. The method according to claim 1, wherein the determining step comprises performing a first pre-processing algorithm and the defining step comprises, for a respective line n,
    defining a first criterion using a first decision variable representing the sum of background noise power, on a respective frequency at a receiver of said respective line n, and an optional, selectable first criterion margin parameter.

3. The method according to claim 2, wherein the establishing step comprises:
    establishing, in a first establishing sub-step, for the respective line n, if a transmitted signal on another line over a channel results in cross-talk exceeding the level related to the defined first decision variable, optionally with a first criterion margin parameter added,
    establishing, in a second establishing sub-step, for the respective line n, if a transmitted signal on another line over a channel results in cross-talk exceeding the level related to the defined second decision variable, optionally with a second criterion margin parameter added.

4. The method according to claim 3, wherein the determining step comprises:
    applying a first and a second pre-processing algorithm for performing the first and second establishing sub-steps.

5. The method according to claim 4, wherein, the determining step comprises:
    application of the pre-processing algorithm or algorithms using said first or said second, or both said decision variable to determine the respective relevant line sets, line by line or in parallel for a plurality of, or all, lines in the cable binder or in the cable.

6. The method according to claim 3, wherein the determining step comprises:
    applying a common pre-processing algorithm for the first and second establishing sub-steps.

7. The method according to claim 1, wherein, the defining step comprises, for a respective line n,
   defining a second criterion using as level a second decision variable comprising the sum of the background noise power of said respective line n and the sum of far-end cross-talk from all other lines except line m to which a signal is transmitted over a channel on a respective frequency at a receiver and an optional, selectable second criterion margin parameter.

8. The method according to claim 1, wherein the examining step comprises:
   establishing, for the respective line n, if a transmitted signal on another line m, and frequency thereof, over a channel results in far-end cross-talk exceeding the defined decision variable;
   if yes;
the identifying step comprises:
   indicating the line m as forming part of the interference relevant line set for said respective line n;
   repeating for the respective line n the examining and identifying steps for each other line, and each respective frequency thereof, of the cable binder or cable,
and the method further comprises the step of:
   performing the examining step, the identifying step and the repeating step for each other line in the cable binder or cable.

9. The method according to claim 1 wherein the defining step comprises:
   defining a first or second cross-talk filter criterion,
   establishing, by measuring, retrieving from a database, or assuming, background noise level for each respective line, at the receiver of said line, from all other lines in a cable or cable binder containing said respective line.

10. The method according to claim 1, wherein the determining step comprises using channel matrix H to identify, for each line, the respective relevant line set, and wherein the step of using channel matrix H comprises:
   obtaining channel matrix H by performing measurements or by retrieving stored, measured channel matrix H,
   determining, for each line, which channel matrix elements that are relevant by implementing the defined criterion.

11. The method according to claim 1 wherein the resource management step comprises implementing DSM level 2.

12. The method according to claim 11, wherein the resource management applying step comprises
   using a Spectrum Balancing algorithm as an algorithm, and:
   using the relevant channel matrix H element data in said Spectrum Balancing algorithm.

13. The method according to claim 1 wherein, the resource management step comprises implementing DSM level 3, based on a Vectoring algorithm.

14. The method according to claim 1 further comprising the steps of:
   updating line state for a line n,
   updating line state only for the lines in the, for line n, determined relevant line set.

15. The method according to claim 1 wherein each line is equipped with a DSL transceiver in each end, that each transceiver implements discrete multi-tone modulation, DMT, and is adapted to operate over the respective line comprising a twisted-pair line with K independent sub-channels.

16. The method according to claim 15, measuring channel matrix information through:
   determining a FEXT/NEXT transfer function comprising the steps of selecting a twisted-pair line in a binder comprising a first line n and a second line m,
   providing line n with an input test signal $S_n$ at a near end,
   measuring a received signal on line m at a near end and a far end, and
   determining the NEXT/FEXT transfer function on the basis of the input test signal and the received signals measured on line m at the near end and at the far end, by
      a) transmitting a test signal with a known power spectrum density covering a frequency range of interest on line n at least during measuring intervals,
      b) measuring a first received signal or a noise related quantity at a near end of line m and sending a first report of the first received signal or Power Spectrum Density to a central control unit,
      c) measuring a second received signal or a noise related quantity at a far end of line m and sending a second report of the second received signal or Power Spectrum Density to a central control unit,
      d) stopping transmission of the test signal on line n,
      e) measuring a third received signal or noise related quantity at a near end of line m and sending a third report of the third received signal and Power Spectrum Density to a central control unit,
      f) measuring a fourth received signal or noise related quantity at a far end of line m and sending a fourth report of the fourth received signal or Power Spectrum Density to a central control unit, and
      g) determining the FEXT/NEXT transfer function using the reported data on the received signals at the central control unit wherein all steps are coordinated and controlled from a central location at the central office or customer side.

17. The method according to claim 16, further comprising the step of reducing FEXT and in that the defining step comprises:
   defining at least one filter criterion.

18. The method according to claim 16, further comprising the step of reducing NEXT and in that the defining step comprises defining at least one NEXT filter criterion.

19. A system for managing transmission resources in a digital communication system, comprising:
   an access network with a plurality of access cables, comprising a number of lines, each of said lines being equipped with a near-end transceiver and a far-end transceiver;
   resource management means for reducing or minimizing impairments;
   determining means adapted to, for a respective line, determine a relevant line set including only interference relevant lines for said line by examining, for each respective line, if a criterion is met in respect to each other line, and identifying the lines for which the criterion is met as lines belonging to the interference relevant line set for said respective line,
   wherein the criterion comprises at least one decision variable, relating to a noise power spectral density, and indicating a level of acceptance for the respective line on each respective frequency within a frequency band of interest, with respect to said decision variable, and
   wherein said resource management means are adapted to apply spectral management using one or more algorithms on said line, based on the determined interference relevant line set for that line.

20. The system according to claim 19, wherein the determining means comprises channel matrix H establishing means and calculating means adapted to use the established channel matrix H to determine the respective relevant line sets.

21. The system according to claim 20, wherein the channel matrix information establishing means comprises a processing device connected with a non-transitory storage and the calculating means comprises a processor for algorithm implementation, said calculating means being adapted to communicate with or comprise a criterion defining means adapted to find or define at least one criterion based on a first decision variable or a second decision variable, and in that said calculating means are adapted to determine relevant line sets for each line based on the criteria defined using said first or second decision variables.

* * * * *

UNITED STATES PATENT AND TRADEMARK OFFICE
CERTIFICATE OF CORRECTION

PATENT NO.        : 8,848,555 B2
APPLICATION NO.   : 13/130127
DATED             : September 30, 2014
INVENTOR(S)       : Lindqvist et al.

It is certified that error appears in the above-identified patent and that said Letters Patent is hereby corrected as shown below:

In the Specification

In Column 5, Line 22, delete "set" and insert -- set 60 --, therefor.

In Column 8, Line 13, delete "of" and insert -- on --, therefor.

In Column 12, Line 64, delete "means" and insert -- means 4 --, therefor.

Signed and Sealed this
Nineteenth Day of May, 2015

Michelle K. Lee
*Director of the United States Patent and Trademark Office*

CERTIFICATE OF CORRECTION (continued)
U.S. Pat. No. 8,848,555 B2

Column 14, lines 15-32, delete

"
repeat $N \begin{cases} \text{for } n_{opt} = 1: N \quad // n_{opt} \text{ is the line index to be optimized} \\ \text{repeat} \\ \quad // \text{ fix the current values } s_m^k, \forall m \neq n_{opt} \\ K \begin{cases} \text{for } k = 1: K \\ // \text{ call function to calculate } L_k. \\ P_{level} \\ N'^k_{n_{opt}} \end{cases} \begin{cases} \text{Calculate } I_k(H^k, s_n^k)\{ \\ b_n^k = \log_2\left[1 + \dfrac{s_n^k |h_{n,n}^k|^2}{\Gamma\left(\sigma_n^k + \sum\limits_{m \neq n} s_m^k |h_{n,m}^k|^2\right)}\right] \\ \} \\ \text{calculate } s_{n_{opt}}^k = \text{argmax} I_k \end{cases} \\ \text{end} \\ \text{until convergence} \\ \text{end} \end{cases}$ until convergence
"

and insert repeat

$N \begin{cases} \textit{for } n_{opt} = 1 : N \quad // n_{opt} \text{ is the line to be optimized} \\ \quad // \text{ fix the current values } s_m^k, \forall m \neq n_{opt} \\ \textit{repeat} \\ K \begin{cases} \textit{for } k = 1: K \\ P_{level} \\ N'^k_{n_{opt}} \end{cases} \begin{cases} \textit{calculate } L_k(\mathbf{H}^k, s_n^k) \{ \\ b_n^k = \log_2\left[1 + \dfrac{s_n^k |h_{n,n}^k|^2}{\Gamma\left(\sigma_n^k + \sum_{m \in IndN'} s_m^k |h_{n,m}^k|^2\right)}\right] \\ \} \\ \textit{calculate } s_{n_{opt}}^k = \text{arg max } L_k \end{cases} \\ \textit{end} \\ \textit{until} \text{ convergence.} \\ \textit{end} \end{cases}$ until convergence. --.

CERTIFICATE OF CORRECTION (continued)
U.S. Pat. No. 8,848,555 B2

In the Claims

In Column 17, Line 47, in Claim 12, delete "and:" and insert -- and --, therefor.

In Column 17, Line 63, in Claim 16, delete "claim 15, measuring" and insert -- claim 15, further comprising: measuring --, therefor.